United States Patent
Brotherton et al.

(10) Patent No.: US 10,246,029 B2
(45) Date of Patent: Apr. 2, 2019

(54) ACCESSORY ARM FOR LIFT TRUCK

(71) Applicant: Hyster-Yale Group, Inc., Fairview, OR (US)

(72) Inventors: Joseph A. Brotherton, Portland, OR (US); Jeffrey G. Stephenson, Nicholasville, KY (US); Gary L. Owens, Berea, KY (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 233 days.

(21) Appl. No.: 15/259,929

(22) Filed: Sep. 8, 2016

(65) Prior Publication Data

US 2017/0072870 A1 Mar. 16, 2017

Related U.S. Application Data

(60) Provisional application No. 62/217,773, filed on Sep. 11, 2015.

(51) Int. Cl.
| | |
|---|---|
| *B60R 11/02* | (2006.01) |
| *B60R 11/06* | (2006.01) |
| *B60R 16/02* | (2006.01) |
| *B66F 9/075* | (2006.01) |
| *H02G 3/04* | (2006.01) |

(52) U.S. Cl.
CPC .......... *B60R 11/0235* (2013.01); *B60R 11/06* (2013.01); *B60R 16/0207* (2013.01); *B66F 9/0759* (2013.01); *B66F 9/07504* (2013.01); *H02G 3/04* (2013.01)

(58) Field of Classification Search
CPC . B60R 11/0235; B60R 11/06; B60R 16/0207; B60R 2011/0052; B60R 11/0229; B60R 2011/0084; B60R 2011/008; B66F 9/0759; B66F 9/07504; H02G 3/04
See application file for complete search history.

(56) References Cited

U.S. PATENT DOCUMENTS

| | | | | |
|---|---|---|---|---|
| 2,711,872 A | * | 6/1955 | Lampke | A61J 9/0638 248/103 |
| 4,345,147 A | * | 8/1982 | Aaron | G06F 3/0227 235/385 |
| 4,392,660 A | * | 7/1983 | Mason | B60J 5/0487 105/440 |
| 4,638,969 A | * | 1/1987 | Brown | F16M 11/2014 248/122.1 |
| 4,771,544 A | * | 9/1988 | Riutta | G01B 5/207 33/288 |

(Continued)

*Primary Examiner* — Paul N Dickson
*Assistant Examiner* — Timothy Wilhelm
(74) *Attorney, Agent, or Firm* — Schwabe Williamson & Wyatt

(57) ABSTRACT

An accessory arm for a lift truck includes at least one rear attachment mechanism affixed to a rear overhead guard leg of the lift truck and a front attachment mechanism affixed to a front overhead guard leg of the lift truck. The accessory arm further includes an accessory bar rotationally mounted to the at least one rear attachment mechanism and to engage with the front attachment mechanism when the accessory bar is in a closed position. A wiring harness connected to a battery of the lift truck and routed within the accessory bar to a device mounted to the accessory bar, the wiring harness to provide power to the device.

18 Claims, 15 Drawing Sheets

(56) References Cited

U.S. PATENT DOCUMENTS

| | | | | |
|---|---|---|---|---|
| 5,465,207 A * | 11/1995 | Boatwright | B60R 11/02 | 701/52 |
| 5,529,369 A * | 6/1996 | Welborn | B60J 5/0487 | 280/DIG. 5 |
| 5,632,462 A * | 5/1997 | Kallas | B60R 11/02 | 224/42.11 |
| 5,642,818 A * | 7/1997 | Brent | B60R 9/02 | 211/105.6 |
| 6,113,047 A * | 9/2000 | Wung | B60R 11/02 | 224/929 |
| 6,179,263 B1 * | 1/2001 | Rosen | B60R 11/0235 | 248/278.1 |
| 6,409,029 B1 * | 6/2002 | Bermes | A01D 75/004 | 211/207 |
| 6,474,705 B1 * | 11/2002 | Mori | E02F 9/163 | 292/216 |
| 6,530,448 B2 * | 3/2003 | Abels | B62D 33/06 | 180/271 |
| 6,808,038 B2 * | 10/2004 | Schneider | B60J 5/042 | 180/271 |
| 6,820,926 B2 * | 11/2004 | Matsuoka | B60R 11/0235 | 296/1.09 |
| 6,890,036 B2 * | 5/2005 | Wiener | B60J 5/042 | 280/748 |
| 6,902,024 B2 | 6/2005 | Miiller et al. | | |
| 7,097,237 B2 * | 8/2006 | Weiner | B60J 5/0487 | 280/749 |
| 7,703,834 B1 * | 4/2010 | Hardy | B60R 9/06 | 296/102 |
| 8,087,623 B2 * | 1/2012 | Suddarth | B60R 11/0229 | 248/122.1 |
| 8,235,342 B2 * | 8/2012 | Pfister | F16C 11/103 | 248/292.14 |
| 8,403,490 B2 * | 3/2013 | Sugiyama | G02B 27/0172 | 345/8 |
| 8,596,599 B1 * | 12/2013 | Carson | B60R 11/0235 | 211/26 |
| 8,646,826 B2 * | 2/2014 | Wihinen | B60K 35/00 | 296/71 |
| 8,944,395 B2 * | 2/2015 | Bonito | B60R 11/0235 | 248/276.1 |
| 9,056,587 B2 * | 6/2015 | Montgomery | B60R 11/0229 | |
| 9,511,701 B2 * | 12/2016 | Tsumiyama | B60P 1/28 | |
| 9,610,888 B2 * | 4/2017 | Eboli | B60Q 1/18 | |
| 9,613,332 B2 * | 4/2017 | West | H04N 5/772 | |
| 9,663,338 B1 * | 5/2017 | James | B62D 65/16 | |
| 9,702,112 B2 * | 7/2017 | Shioji | E02F 9/0858 | |
| 9,849,694 B2 * | 12/2017 | Brown | H05K 999/00 | |
| 9,878,677 B2 * | 1/2018 | Clements | B60R 11/0235 | |
| 9,963,084 B2 * | 5/2018 | Jacobsthal | A01D 41/12 | |
| 9,989,191 B2 * | 6/2018 | Parker | B60R 11/0235 | |
| 2002/0175254 A1 * | 11/2002 | Lee | B60R 11/0235 | 248/289.11 |
| 2003/0168902 A1 | 9/2003 | Wiener et al. | | |
| 2004/0164210 A1 * | 8/2004 | Le | B60R 11/0235 | 248/200 |
| 2006/0102767 A1 * | 5/2006 | Brogden | B65H 49/26 | 242/390 |
| 2010/0065595 A1 * | 3/2010 | Brogden | B65H 49/26 | 224/401 |
| 2012/0000955 A1 * | 1/2012 | King | B60R 9/02 | 224/545 |
| 2013/0193290 A1 * | 8/2013 | Lohmann | B60R 11/0252 | 248/276.1 |
| 2014/0263511 A1 * | 9/2014 | Clements | B60R 11/02 | 224/483 |
| 2016/0052464 A1 * | 2/2016 | Wadey | B62J 11/00 | 224/553 |
| 2016/0129852 A1 * | 5/2016 | Hawkins | B60R 11/06 | 414/800 |
| 2016/0186410 A1 * | 6/2016 | Shioji | E02F 9/16 | 296/190.1 |
| 2016/0264387 A1 * | 9/2016 | Yoon | B66F 9/08 | |
| 2016/0368431 A1 * | 12/2016 | Boer | B60R 11/0235 | |

* cited by examiner

ACCESSORY ARM FOR LIFT TRUCK

STATEMENT OF RELATED MATTERS

This application claims priority to U.S. Provisional Patent Application No. 62/217,773, entitled Accessory Arm for Lift Truck, filed on Sep. 11, 2015; the contents of which is herein incorporated by reference in its entirety.

TECHNICAL FIELD

This application relates to the field of industrial powered vehicles configured to transport goods and materials. In particular, certain examples described herein relate to lift trucks.

BACKGROUND

Lift truck operators are frequently assigned to complete tasks that accompany operating the lift truck and that may involve working with additional equipment or tools to accomplish the tasks. Lift truck operators commonly place such additional equipment in any available space on the lift truck, such as behind the operator's seat, or secure such equipment to the lift truck itself, such as to the legs of the overhead guard. Because of the limited space available in lift trucks, such additional equipment commonly clutters the operator compartment, may inhibit the operator's view, and may become loose during operation of the lift truck and become a hazard if not adequately secured. The present inventors recognized that because individual operators secure equipment differently to lift trucks, for a fleet of lift trucks, each lift truck is likely to be configured differently regarding the location of additional equipment which makes switching between lift trucks difficult for operators and maintenance of the additional equipment difficult.

The present application addresses these and other problems of the prior art.

SUMMARY

An accessory arm for a lift truck is disclosed herein that may include at least one rear attachment mechanism affixed to a rear overhead guard leg of the lift truck and a front attachment mechanism affixed to a front overhead guard leg of the lift truck. The accessory arm may further include an accessory bar rotationally mounted to the at least one rear attachment mechanism and to engage with the front attachment mechanism when the accessory bar is in a closed position. A wiring harness may be connected to a battery of the lift truck and routed within the accessory bar to a device mounted to the accessory bar, the wiring harness to provide power to the device.

An accessory arm for a lift truck is disclosed herein that may include an upper rear attachment mechanism configured to be affixed to a rear overhead guard leg of the lift truck. The accessory arm may further include a lower rear attachment mechanism configured to be affixed to the rear overhead guard leg, the lower rear attachment mechanism configured to be attached to the rear overhead guard leg at a location lower than the upper rear attachment mechanism, and a front attachment mechanism configured to be affixed to a front overhead guard leg of the lift truck. An L-shaped accessory bar may be rotationally mounted to the upper rear attachment mechanism and the lower rear attachment mechanism, and that engages with the front attachment mechanism when the accessory bar is in a closed position. The accessory arm may further include an upper mounting plate attached to the upper rear attachment mechanism, wherein the upper mounting plate includes an aperture configured to receive a hooked end of a dock plate tool and a lower mounting plate attached to the lower rear attachment mechanism, wherein the lower mounting plate includes a bracket configured to contact a handle of the dock plate tool and limit movement of the dock plate tool.

An accessory arm for a lift truck is disclosed herein that may include at least one rear attachment mechanism affixed to a rear overhead guard leg of the lift truck and a front attachment mechanism affixed to a front overhead guard leg of the lift truck. An accessory bar may be rotationally mounted to the at least one rear attachment mechanism and may engage the front attachment mechanism when the accessory bar is in a closed position. A mount may be attached to the accessory bar, the mount to affix an accessory to the accessory bar.

DETAILED DESCRIPTION

Figure 1:
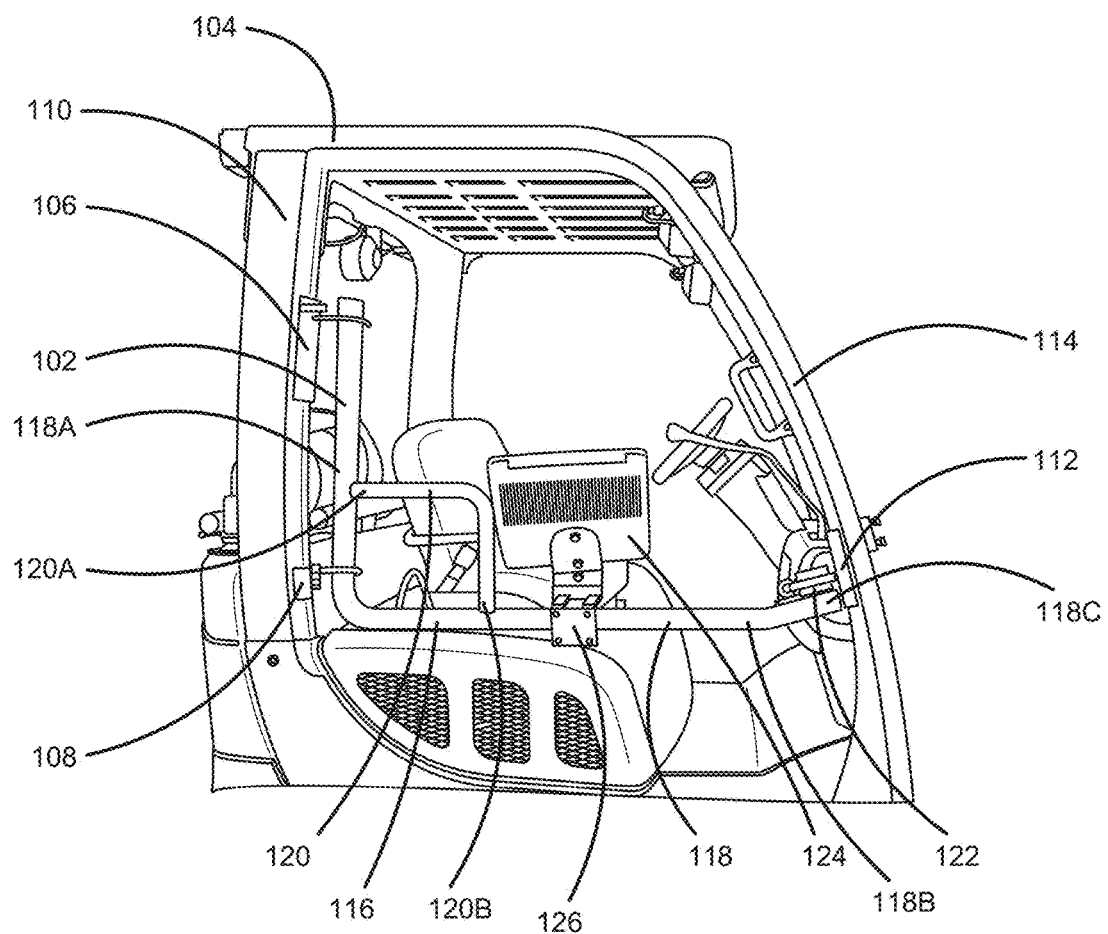
FIG. 1 illustrates a right side view of an example accessory arm mounted to a lift truck.

FIG. 1 illustrates an example accessory arm 102 mounted to a lift truck 104. Optionally, neither the accessory arm 102 nor any of the accessories mounted thereto extend beyond an exterior side of a lift truck, such that should the side of the lift truck contact an obstacle none of the accessory arm 102 or attached accessories will contact the obstacle.

The accessory arm 102 may include an upper rear attachment mechanism 106 and a lower rear attachment mechanism 108. The upper rear attachment mechanism 106 and the lower rear attachment mechanism 108 may be configured to affix to a rear overhead guard leg 110 of the lift truck 104. The upper rear attachment mechanism 106 may be configured to affix to the rear overhead guard leg 110 at a higher position than the lower rear attachment mechanism 108.

Optionally, the upper rear attachment mechanism 106 and the lower rear attachment mechanism 108 attach to the rear overhead guard leg 110 by each clamping around a portion of the rear overhead guard leg 110. The upper rear attachment mechanism 106 and the lower rear attachment mechanism 108 may each include a forward portion and a rear portion, the forward portion to contact a front portion of the rear overhead guard leg 110 and the rear portion to contact a rear portion of the rear overhead guard leg 110. In certain embodiments, frictional force created by the forward portion and the rear portion of each of the upper rear attachment mechanism 106 and the lower rear attachment mechanism 108 holds the upper rear attachment mechanism 106 and the lower rear attachment mechanism 108 in place on the rear overhead guard leg 110. In other examples, one or more fasteners may attach between the forward portion and the rear portion of each of the upper rear attachment mechanism 106 and the lower rear attachment mechanism 108, and may cause the forward portion and the rear portion to be drawn toward each other when the fasteners are tightened to affix the corresponding upper rear attachment mechanism 106 and lower rear attachment mechanism 108 to the rear overhead guard leg 110.

In other examples, the upper rear attachment mechanism 106 and the lower rear attachment mechanism 108 may be affixed to the rear overhead guard leg 110. For example, via one or more fasteners such as bolts engaging threaded apertures formed in the rear overhead guard leg 110 and one or more corresponding apertures formed in the upper rear attachment mechanism 106 and the lower rear attachment mechanism 108, or via welding. Other suitable attachment manners may be used.

The accessory arm 102 may further include a front attachment mechanism 112. The front attachment mechanism 112 may be configured to be affixed to a front overhead guard leg 114 of the lift truck 104. The front attachment mechanism 112 may be affixed to the front overhead guard leg 114 by any of the means of attachment described in relation to the upper rear attachment mechanism 106 and the lower rear attachment mechanism 108.

The accessory arm 102 may include an accessory bar 116. The accessory bar 116 may be formed of a rigid material, such as metal, hard plastic, hard rubber, polyvinyl chloride (PVC), or some combination thereof. The accessory bar 116 may include one or more elongated members. For example, such elongated members may be tubes with a circular shape, oval shape, rectangular shape, or other suitable shape and a hollow center. In other examples, the elongated members may be solid and formed of a rigid material, and may have circular, oval, rectangular, "L", or other suitable shapes. Further, in some examples, the accessory bar 116 may include one or more indents formed along the length of one or more elongated members.

The accessory bar 116 may include a first elongated member 118 bent into an L-shape and a second elongated member 120 bent into an L-shape. The first L-shaped elongated member 118 may be larger in length, size, circumference, or some combination thereof, than the second L-shaped elongated member 120. The second elongated member 120 is secured between a first leg 118A and a second leg 118B of the first elongated member 118 to provide one or more of rigidity for the first elongated member 118 and additional mounting space for accessories. A first end 120A of the second L-shaped elongated member 120 may couple to the first leg 118A of the first L-shaped elongated member 118 along a length of the first leg 118A. The second end 120B of the second L-shaped elongated member 120 may couple to the second leg 118B of the first L-shaped elongated member 118 along a length of the second leg 118B. In some examples, a second elongated member may be straight, or may have multiple bends in it, while in other examples the second elongated member may be omitted.

The accessory bar 116 may be moveably mounted to the upper rear attachment mechanism 106 and the lower rear attachment mechanism 108. The first leg 118A of the first L-shaped elongated member 118 may be coupled to the upper rear attachment mechanism 106 and the lower rear attachment mechanism 108. The accessory bar 116 may be rotationally mounted to the upper rear attachment mechanism 106 and the lower rear attachment mechanism 108 and may rotate about an axis formed by the mounting points of the accessory bar 116 to the upper rear attachment mechanism 106 and the lower rear attachment mechanism 108. Optionally, an accessory bar, such as accessory bar 116, rotates such that a portion of a latch mechanism, such as latch mechanism 122 described below, is vertically elevated to a higher position when the accessory bar is at an open position, that is, swung to a position that is approximately 180 degrees from the closed position illustrated in FIG. 1, compared to when the accessory bar is at a closed position. Such rotation that lifts a portion of a latch mechanism uses gravity to facilitate moving the accessory bar from an open position to a closed position.

The second leg 118B of the first L-shaped elongated member 118 may extend substantially perpendicularly (for example, within plus or minus 10 degrees from horizontal) from the first leg 118A. An end portion 118C of the second leg 118B of the first L-shaped elongated member 118 may engage with the front attachment mechanism 112. The front attachment mechanism 112 may be coupled to the end portion and may maintain the position of the accessory bar 116, extending among the upper rear attachment mechanism 106, the lower rear attachment mechanism 108 and the front attachment mechanism 112.

In examples where the accessory bar 116 is rotationally mounted to the upper rear attachment mechanism 106 and the lower rear attachment mechanism 108, the end portion 118C of the second leg 118B may engage with the front attachment mechanism 112 when the accessory bar 116 is in a closed position. The accessory bar 116 may be in the closed position when the accessory bar 116 is substantially parallel (within plus or minus 10 degrees from parallel) to a side of the lift truck 104. When in the closed position, the end portion 118C of the second leg 118B may releasably engage a latch mechanism 122 of the front attachment mechanism 112. The latch mechanism 122 may include one or more keepers or strikes that contact the end portion 118C and retain the accessory bar 116 in the closed position. The latch mechanism 122 may include a handle or other actuation mechanism, such as a button, to disengage the latch mechanism 122 from the accessory bar 116, and allow the accessory bar 116 to transition from the closed position to rotate freely around the axis of rotation.

In some examples, the latch mechanism 122 may be configured to disengage from the accessory bar 116 in response to application of a specified amount of force applied to the accessory bar 116, the force directed to move the accessory bar 116 away from the front attachment mechanism 112. In other examples, the latch mechanism 122 may include a magnet, such as a permanent magnet or an electromagnet, to engage the end portion. When the accessory bar 116 is moved within a proximity of the magnet, the magnet may generate a magnetic force that draws the accessory bar 116 into the closed position and maintains the accessory bar 116 in the closed position. The accessory bar 116 may be disengaged from the magnet by application of a force greater than the magnetic force being applied to the accessory bar 116 in a direction away from the front attachment mechanism 112.

One or more accessories, such as accessory 124, may be releasably mounted to the accessory bar 116. The accessory 124 may be a monitor, a display, a computer device, a scanner, an equipment holder (such as a stretch wrap holder, a tape holder, a fire extinguisher holder, or similar object holders), or other suitable accessory. One or more accessories, such as accessory 124, may be secured to the accessory bar 116. The accessory 124 may be secured to the accessory bar 116 by a mount 126. The mount 126 may include a clamping mechanism that clamps to the accessory bar 116 and releasably affixes accessory 124 to the accessory bar 116. The clamping mechanism may be used to adjustably attach the mount 126 in one location on the accessory bar 116, or at different locations along a length of the accessory bar 116. In particular, the mount 126 may be clamped to any portion of the accessory bar 116, including the first L-shaped elongated member 118 and the second L-shaped elongated member 120. The mount 126 may include lockable, rotational members such that accessory 124 is rotationally attached to the mount 126 permitting the accessory 126 to rotate in a vertical, horizontal, clockwise, and counterclockwise direction around the point of connection between the accessory 124 and the mount 126.

Figure 2:
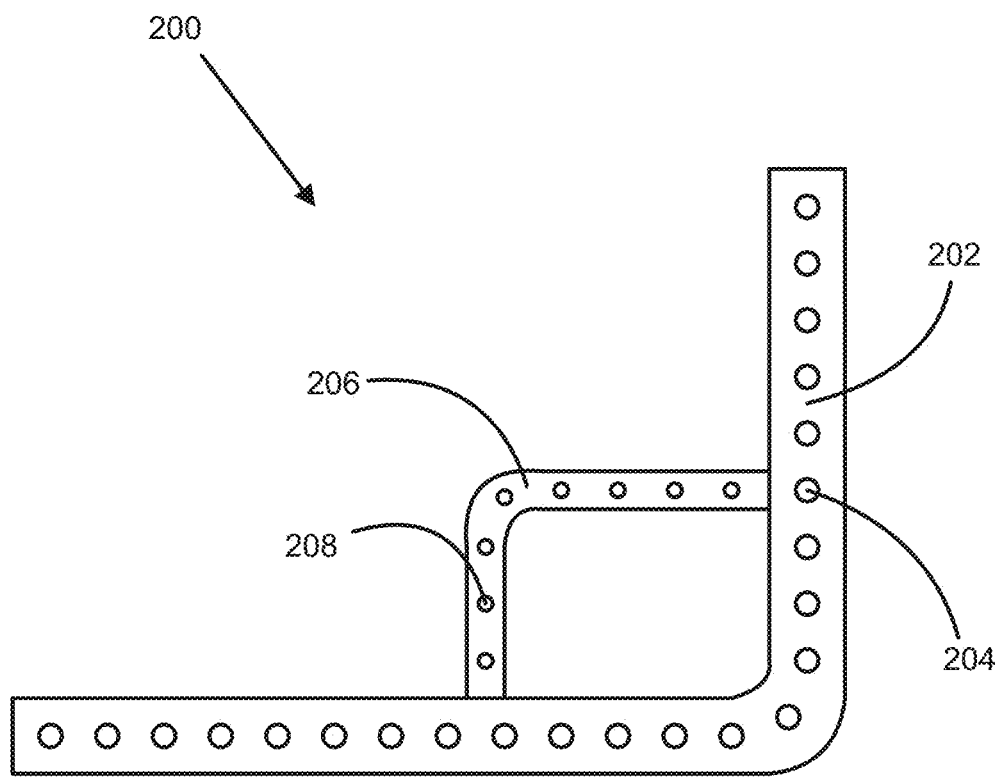
FIG. 2 illustrates a left side view of an example accessory bar with apertures.

FIG. 2 illustrates an example accessory bar 200 with apertures. The accessory bar 200 may include one or more of the features of the accessory bar 116 (FIG. 1), including the first L-shaped elongate member 118 (FIG. 1), the second L-shaped elongate member 120 (FIG. 1), and the material of which the accessory bar 200 is formed. Further, the accessory bar 200 may be attached to a lift truck in the same manner as the accessory bar 116.

A first plurality of apertures 204 may be formed along the length of the first L-shaped elongate member 202. The apertures 204 may be a uniform size, or differently sized. The first plurality of apertures 204 may include apertures separated from each other by a uniform distance along the length of the first L-shaped elongated member 202 (as illustrated). In some examples, the first plurality of apertures 204 may include apertures separated by different differences along the length of the first L-shaped elongated member 202. The first plurality of apertures 204 may be utilized for routing one or more wiring harnesses within the accessory bar 200, affixing a mount (such as mount 126 (FIG. 1)) to the accessory bar 200, affixing the accessory bar to an upper rear attachment mechanism (such as upper rear attachment mechanism 106) and a lower rear attachment mechanism (such as the lower rear attachment mechanism 108), or any combination thereof.

A second plurality of apertures 208 may be formed along the length of the second L-shaped elongated member 202. The apertures 208 may be uniform size, or differently sized. The second plurality of apertures 208 may include apertures separated from each other by a uniform distance along the length of the second L-shaped elongate member 206 (as illustrated). In some examples, the second plurality of apertures 208 may include apertures separated by different differences along the length of the second L-shaped elongated member 206. The second plurality of apertures 208 may include apertures of different size than the first plurality of apertures 204 or of a same size of the first plurality of apertures 204. The second plurality of apertures 208 may be utilized for routing of one or more wiring harnesses within the accessory bar 200, affixing a mount (such as mount 126 (FIG. 1)) to the accessory bar 200, or a combination thereof.

While the first plurality of apertures 204 and the second plurality of apertures 208 are illustrated as being formed on a single side of the first L-shaped elongate member 202 and the second L-shaped elongate member 206, respectively, the first plurality of apertures 204, the second plurality of apertures 208, or both, may be formed on one or more sides of the first L-shaped elongate member 202 and the second L-shaped elongate member 206. Further, it is to be understood that the first plurality of apertures 204 and the second plurality of apertures 208 may be formed anywhere along the circumference of the first L-shaped elongate member 202 and the second L-shaped elongate member 206, respectively.

Figure 3:
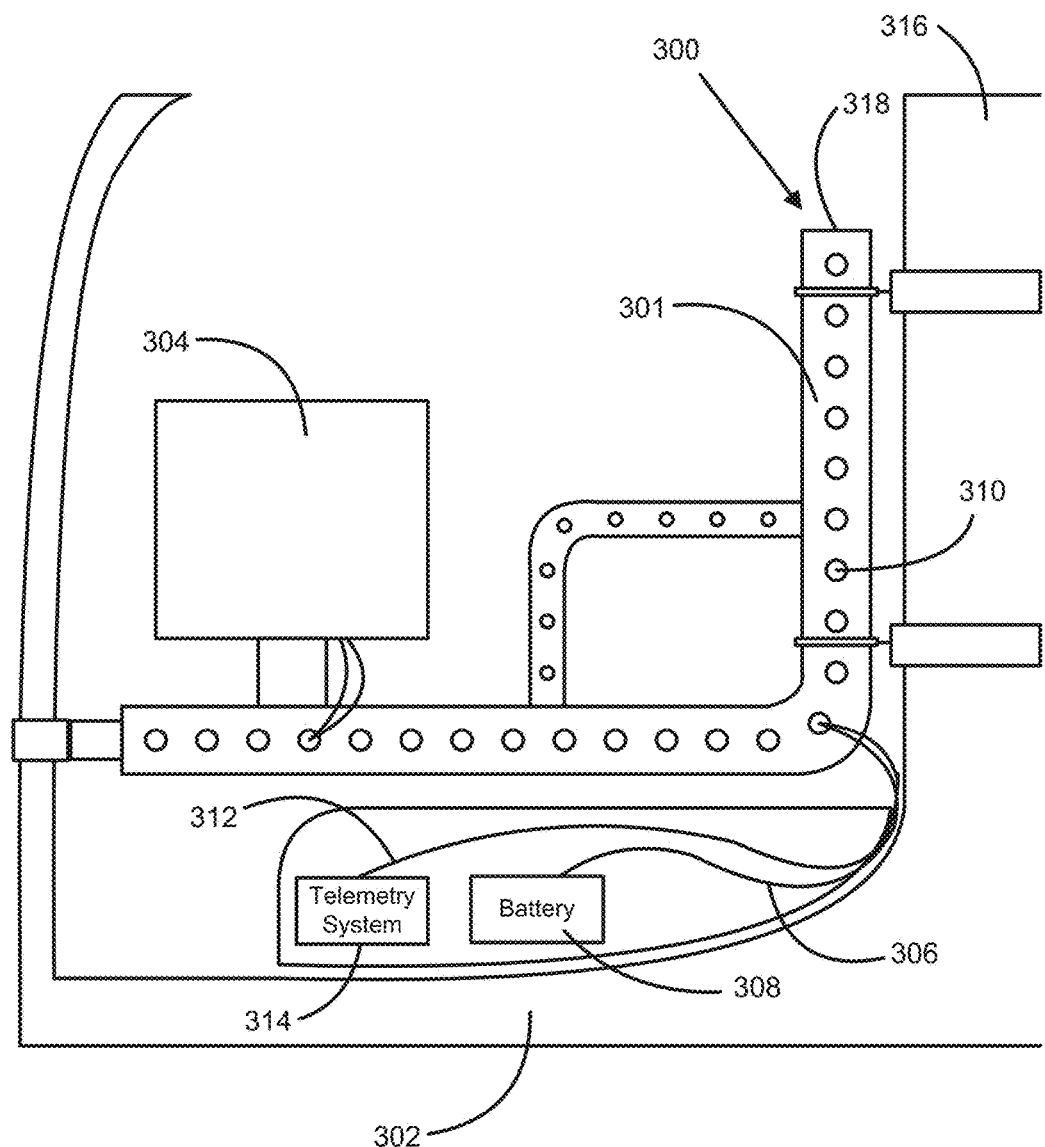
FIG. 3 illustrates a left side view of an example accessory arm with a hard-wired wiring harnesses.

FIG. 3 illustrates an example accessory arm 300 with hard-wired wiring harnesses. The accessory arm 300 may include one or more of the features of the accessory arm 102 (FIG. 1), the accessory bar 200 (FIG. 2), or some combination thereof. Further, in some examples, the accessory arm 300 may be configured similarly as the accessory arm 102 (FIG. 1), the accessory bar 200 (FIG. 2), or some combination thereof. The accessory arm 300 may be attached to a lift truck 302 (portion thereof illustrated).

A mount, such as the mount 126 (FIG. 1), may secure the accessory 304 to the accessory bar 301. One or more wiring harnesses may be routed within the accessory bar 301 to the accessory 304.

A power wiring harness 306 may be electrically coupled to a battery 308 of the lift truck 302 and the accessory 304. The power wiring harness 306 may provide power from the battery 308 to the accessory 304 to provide for operation of the accessory 304. The power wiring harness 306 may be routed from the battery 308 into the accessory bar 301 through one of the plurality of apertures 310 and routed out of the accessory bar 301 to the accessory 304 through another of the plurality of apertures 310. The power wiring harness 306 is illustrated as being routed into the accessory bar 301 via an aperture located in a curved portion of the accessory bar 301 and out of the accessory bar 301 via an aperture located in a substantially horizontal portion of the accessory bar 301, however, it is to be understood that the power wiring harness 306 can be routed into and out of the accessory bar 301 via any one of the plurality of apertures 310, including apertures located in the curved portions of the accessory bar 301, substantially vertical portions of the accessory bar 301, substantially horizontal portions of the accessory bar 301, in a first L-shaped portion of the accessory bar 301, in a second L-shaped portion of the accessory bar 301, or some combination thereof.

In some examples, a telemetry wiring harness 312 may be electrically coupled to a telemetry system 314 of the lift truck 302 and the accessory 304. The telemetry wiring harness 312 may carry data between the accessory 304 and the telemetry system 314. The data may include identification of a pallet that the lift truck 302 and/or operator is interacting with, information related to the pallet, maps of an area surrounding the lift truck 302, locations of objects within the area surrounding the lift truck 302, instructions regarding operation of the lift truck, or some combination thereof. The data may further include information received from other systems communicatively coupled with the telemetry system 314, such as through wireless and wired communicative coupling to the telemetry system 314. The telemetry wiring harness 314 may be routed via one of the plurality of apertures 310 into the accessory bar 301 and may be routed via another of the plurality of apertures 310 out of the accessory bar 301 to the accessory 304. The telemetry wiring harness 312 may be routed via the same apertures as the power wiring harness 306 or different apertures from the power wiring harness 306. Further, the telemetry wiring harness 312 may be routed via any one of the plurality of apertures 310, including apertures located in the curved portions of the accessory bar 301, substantially vertical portions of the accessory bar 301, substantially horizontal portions of the accessory bar 301, in a first L-shaped portion of the accessory bar 301, in a second L-shaped portion of the accessory bar 301, or some combination thereof.

In some examples, one or both of the power wiring harness 306 and the telemetry wiring harness 312 may be routed along the rear overhead guard leg 316 and into one of the plurality of apertures 310. Further, in some examples, ends of the accessory bar 301, such as end 318, may be open and one or both of the power wiring harness 306 and the telemetry wiring harness 312 may be routed through the open end into the accessory bar 301.

It is to be understood that the power wiring harness 306 and the telemetry system 314 are examples of wiring harnesses that may be routed to the accessory 304. Other wiring harnesses may be routed to the accessory 304 from other systems or components of the lift truck 302 via the accessory arm 300. Further, the accessory 304 may have wireless connectivity and may connect to other systems that are not part of or mounted to the lift truck 302 via the wireless connectivity.

In some embodiments, one or both of upper rear attachment mechanism 320 and lower rear attachment mechanism 322 may include one or more apertures formed in the upper rear attachment mechanism 320 or the lower rear attachment mechanism 322. The one or more apertures may align with one or more of the plurality of apertures 310. One or both of the power wiring harness 306 and the telemetry wiring harness 312 may be routed through the one or more apertures in the upper rear attachment mechanism 320 or the lower rear attachment mechanism and through a corresponding one of the plurality of apertures 310 into the accessory bar 301.

Figure 4:
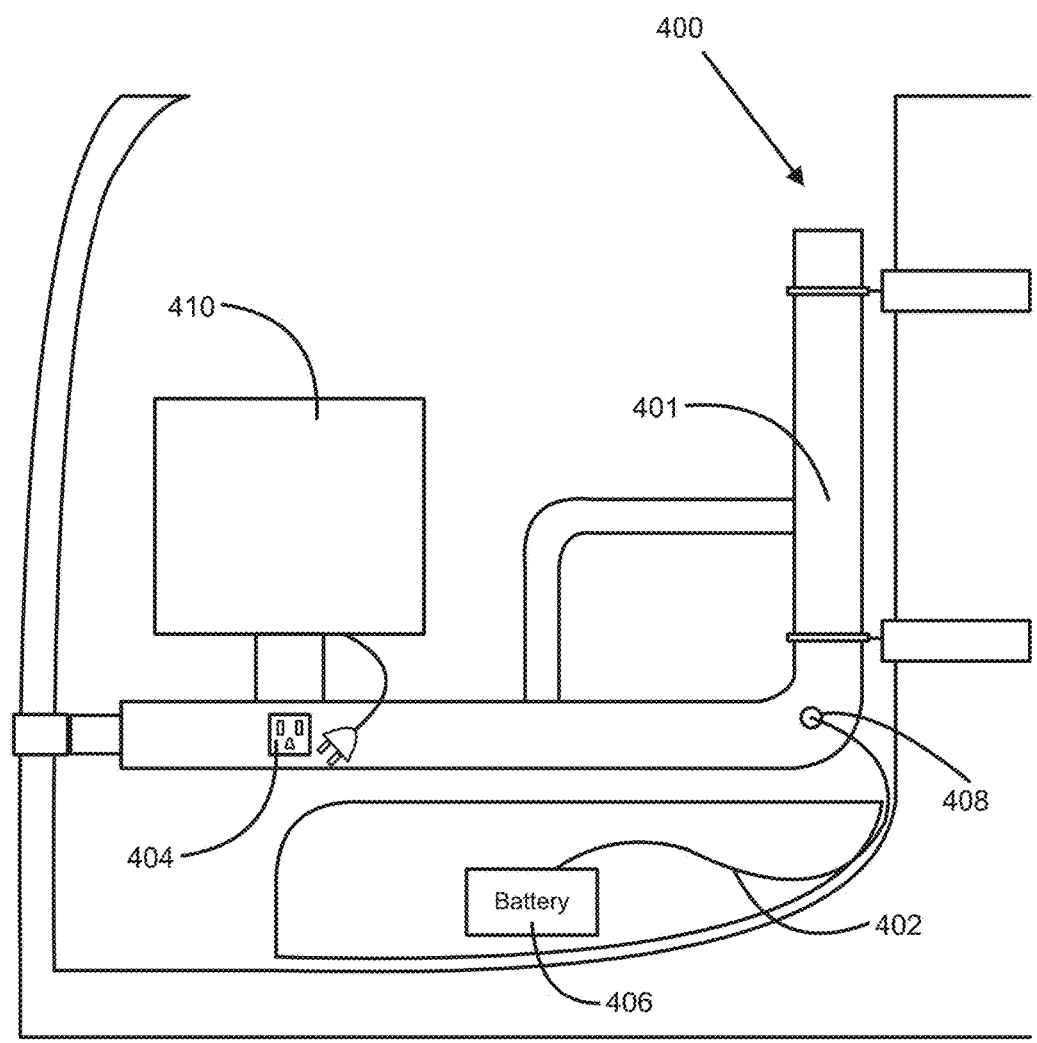
FIG. 4 illustrates a left side view of an example accessory arm with a wiring harness and an electrical socket.

FIG. 4 illustrates an example accessory arm 400 with wiring harness 402 and electrical socket 404. The accessory arm 400 may include one or more of the features of the accessory arm 102 (FIG. 1), the accessory bar 200 (FIG. 2), the accessory arm 300 (FIG. 3), or some combination thereof.

The wiring harness 402 may be electrically coupled to the battery 406 and the electrical socket 404. The wiring harness 402 may be routed into an accessory bar 401 of the accessory arm 400 via aperture 408 and may be electrically coupled with the electrical socket 404 within the accessory bar 401.

The electrical socket 404 may be mounted to the accessory bar 401. In some examples, the electrical socket 404 may be an electrical outlet mounted on the exterior of the accessory bar 401 with the female connector of the electrical outlet exposed on the exterior of the accessory bar and a body of the electrical outlet extending through an aperture into the accessory bar 401. Optionally, the electrical socket 404 includes a converter contained in the accessory bar 401.

The electrical socket 404 may be configured to receive a power cable of an accessory 410 mounted to the accessory bar 401. When the power cable is plugged into the electrical socket 404, the wiring harness 402 may provide power from the battery 406 to the accessory 410.

While the electrical socket 404 is illustrated as a three-pronged electrical outlet, it is to be understood that the electrical socket 404 may be other types of power connectors, such as two-pronged electrical outlets, other standard electrical outlets (as defined for different countries and different power systems), quick connects, or other types of electrical contacts. Further, while the wiring harness 402 is illustrated as being routed into the accessory bar 401 via the single aperture 408, it is to be understood that the wiring harness 402 may be routed into the accessory bar 401 by any of the routing means described in relation to the power wiring harness 306 (FIG. 3) and the telemetry wiring harness 312.

Figure 5:
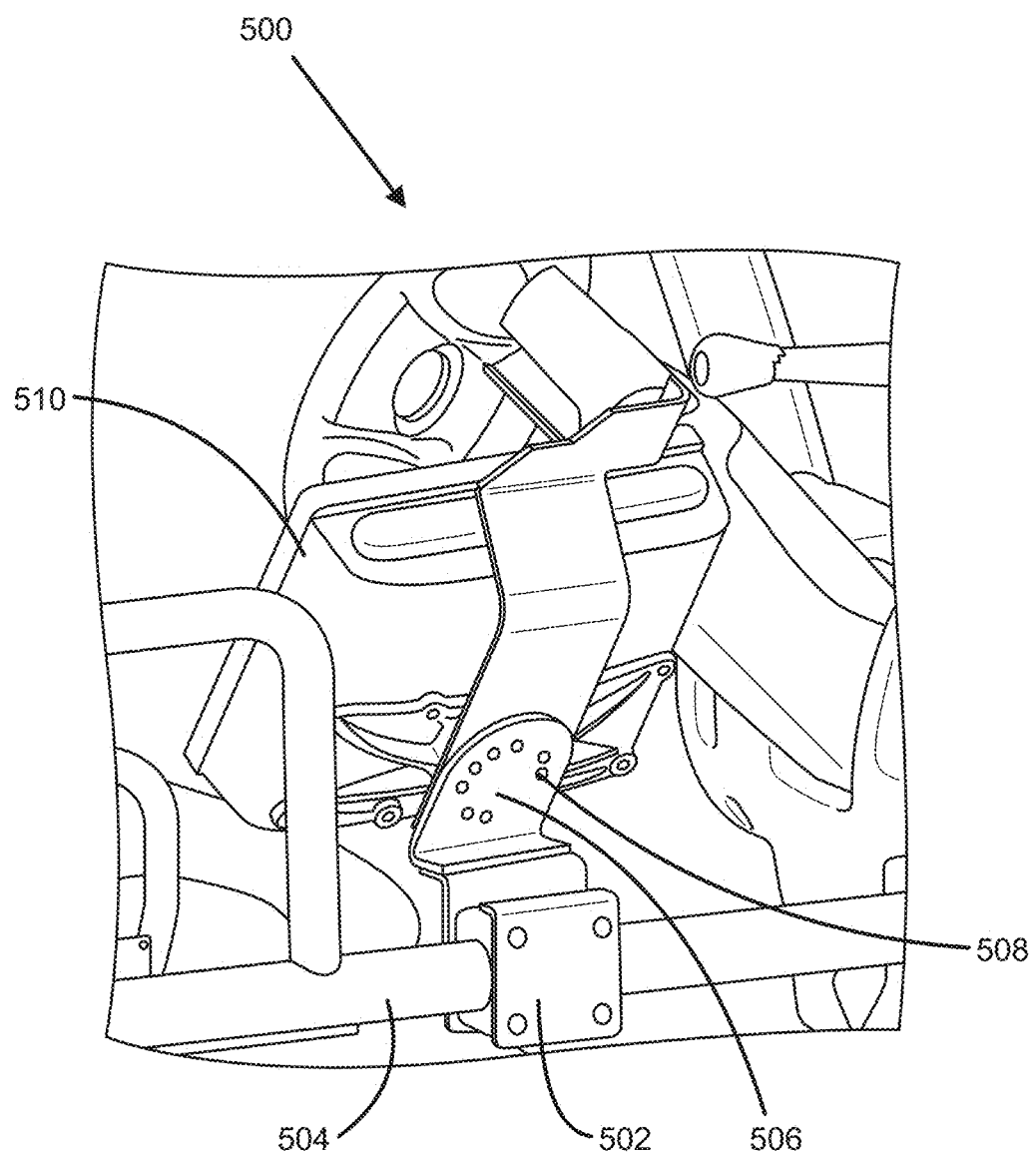
FIG. 5 illustrates a right isometric view of an example monitor holder attached to an example accessory arm.
Figure 6:
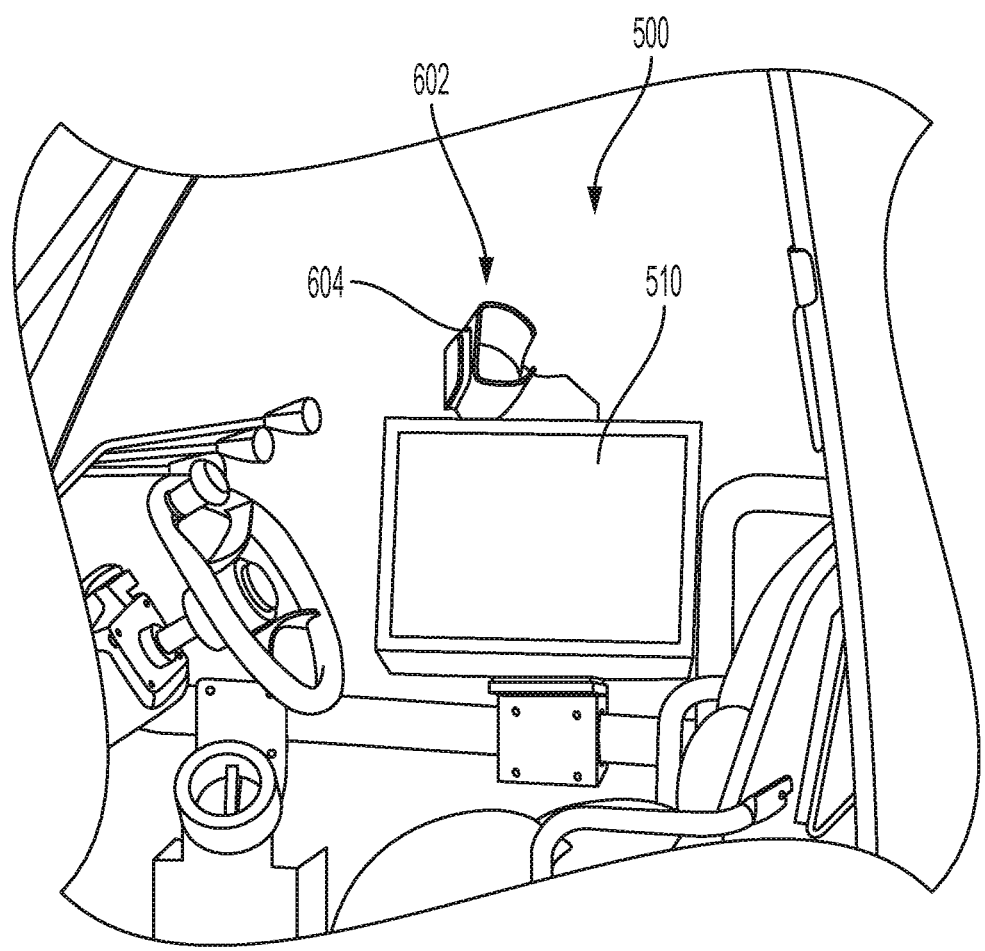
FIG. 6 illustrates a left side view of the example monitor holder of FIG. 5.

FIGS. 5 and 6 illustrate an example monitor holder 500. The monitor holder 500 includes a mount, such as a clamp mechanism 502, to affix the monitor holder 500 to an accessory bar 504. The accessory bar 504 may include one or more of the features of the accessory bar 116 (FIG. 1), the accessory bar 200 (FIG. 2), the accessory bar 301 (FIG. 3), the accessory bar 401 (FIG. 4), or some combination thereof. The clamp mechanism 502 may clamp around a portion of the accessory bar 504. The clamp mechanism 502 may be easily unclamped from the accessory bar 504 and be clamped at the same location in a different angular orientation or to a different portion of the accessory bar 504. In other examples, the mount may include one or more fasteners that engage with apertures formed in the accessory bar 504 that affix the holder 500 to the accessory bar 504.

The holder 500 may include mounting bracket 506 coupled to the clamp mechanism 502. The mounting bracket 506 may include one or more apertures 508 formed in the mounting bracket 506. The apertures 508 may be configured to receive fasteners to secure a monitor 510, which includes a display, computer, or other suitable device, to the mounting bracket 506. The apertures 508 may be formed in locations in the mounting bracket 506 to receive fasteners from a certain monitor, or may be in locations to receive multiple different types of monitors or monitors from multiple different manufacturers. In other examples, a lockable ball and socket connector, or other suitable connector, may secure an accessory to a clamp mechanism.

In some examples, the monitor holder 500 may include a scanner holder 602 that extends from a bottom of the monitor 510 to the top of the monitor 510. The scanner holder 602 may be coupled to the mounting bracket 506 (FIG. 5) and may be located to hold a scanner (not illustrated) above the monitor 510 when the monitor 510 is mounted to the mounting bracket 506. Optionally, the scanner holder 602 is attached to the monitor mount 500 such that when the monitor 510 is moved to a different position the scanner holder 602 moves with the monitor 510. In other examples, the scanner holder 602 may extend to either side of the monitor 510, below the monitor 510, or some combination thereof.

The scanner holder 602 may be shaped to accept a head of a scanner device. The scanner holder 602 may include an extrusion 604 configured to extend over a head of a scanner device and maintain the location of the scanner device when the scanner device is placed in the scanner extrusion 604.

Figure 7:
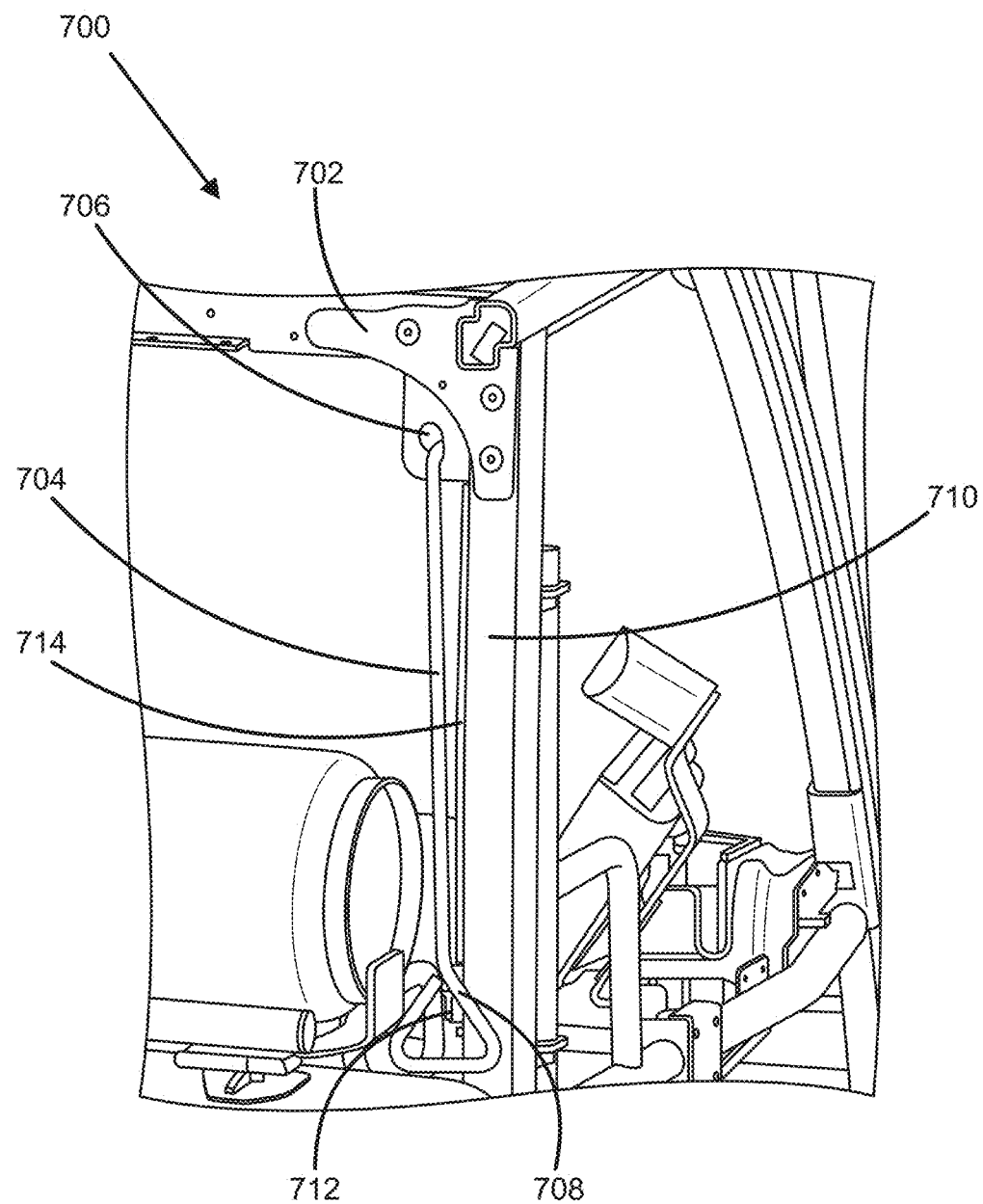
FIG. 7 illustrates rear isometric view of an example dock plate tool holder for an example accessory arm.

FIG. 7 illustrates an example dock plate tool holder 700. The dock plate tool holder 700 may be utilized for securing a dock plate tool 704 to a lift truck. Typically, a dock plate tool 704 is utilized to engage and disengage a dock plate from a cargo truck to create a bridge between the cargo truck and a dock for loading and unloading cargo from the truck.

Typical dock plate tools, such as dock plate tool, 704 include a hook on one end to engage the dock plate and a handle on the other end for an operator to lift the dock plate into an engaged position with the cargo truck.

The dock plate tool holder 700 may include an upper mounting plate 702. The upper mounting plate 702 may be attached to an upper rear attachment mechanism, such as the upper rear attachment mechanism 106 (FIG. 1). The upper mounting plate 702 may be formed of a same piece of material as the upper rear attachment mechanism. In some examples, the upper mounting plate 702 may be affixed to the upper rear attachment mechanism by one or more fasteners that engage with the upper mounting plate 702 and the upper rear attachment mechanism to affix the upper mounting plate 702 to the upper rear attachment mechanism.

The upper mounting plate 702 may include an aperture 706 configured to receive the hooked end of the dock plate tool 704 and allow the dock plate tool 704 to hang from the upper mounting plate 702. Optionally, the aperture 706 is wider in an upper portion of the aperture 706 and narrower in a lower portion of the aperture 706, such that the hooked end of the dock plate tool 704 may be inserted into the wider portion of the aperture 706. As released, the hooked end of the dock plate tool 704 will move into the narrower portion of the aperture 706 to a point where upper mounting plate 702 contacts the dock plate tool 704 on both sides and prevents sideways movement of the hooked end of the dock plate tool 704. In some examples, the aperture 706 may have an upside-down tear drop shape. Optionally, for a tear drop shaped aperture, the narrow portion of the tear drop shape is not positioned vertically, but is offset from a 6 o'clock position, for example, to lie between a 6 o'clock position and a 4 o'clock position when viewed from a rear of a lift truck looking towards the front of the lift truck. Such vertical offset facilitates ergonomically inserting a hook of a dock plate tool 704 into the narrow portion of the tear drop shape when an operator stands to the side of the lift truck and inserts the hook into the tear drop shaped aperture 706.

The dock plate tool holder 700 may further include a lower mounting plate 708. The lower mounting plate 708 may be attached to a lower rear attachment mechanism, such as the lower rear attachment mechanism 108 (FIG. 1). The lower mounting plate 708 may be formed of a same piece of material as the lower rear attachment mechanism. In some examples, the lower mounting plate 708 may be affixed to the lower rear attachment mechanism by one or more fasteners that engage with the lower mounting plate 708 and the lower rear attachment mechanism to affix the lower mounting plate 708 to the lower rear attachment mechanism.

The lower mounting plate 708 may include a surface 709, which may optionally be padded, to prevent the handle of the dock plate tool 704 from contacting a rear overhead guard leg 710 as the lift truck moves. The surface 709 may be orientated to face a same direction as the aperture 706 and may extend from the rear overhead guard leg 710 in that direction.

In some examples, the lower mounting plate 708 may include a bracket 712 to engage with the handle of the dock plate tool 704 and prevent the dock plate tool 704 from swinging as the lift truck moves. The bracket 712 will be described below in relation to FIG. 8.

In some examples, an extension plate 714 may extend between the upper rear attachment mechanism and the lower rear attachment mechanism. The extension plate 714 may extend along the rear overhead guard leg 710 between the upper rear attachment mechanism and the lower rear attachment mechanism. The extension plate 714 may be configured to maintain a distance between the upper rear attachment mechanism and the lower rear attachment mechanism, which in turn maintains a distance between the upper mounting plate 702 and the lower mounting plate 708. A length of the extension plate 714 may be predetermined based on a standard length of the dock plate tool 704 or a standard type or manufacturer of the dock plate tool 704. In other examples, the length of the extension plate 714 may be adjustable, thereby allowing adjustment between the upper mounting plate 702 and the lower mounting plate 708 to engage with different lengths of dock plate tools.

Figure 8:
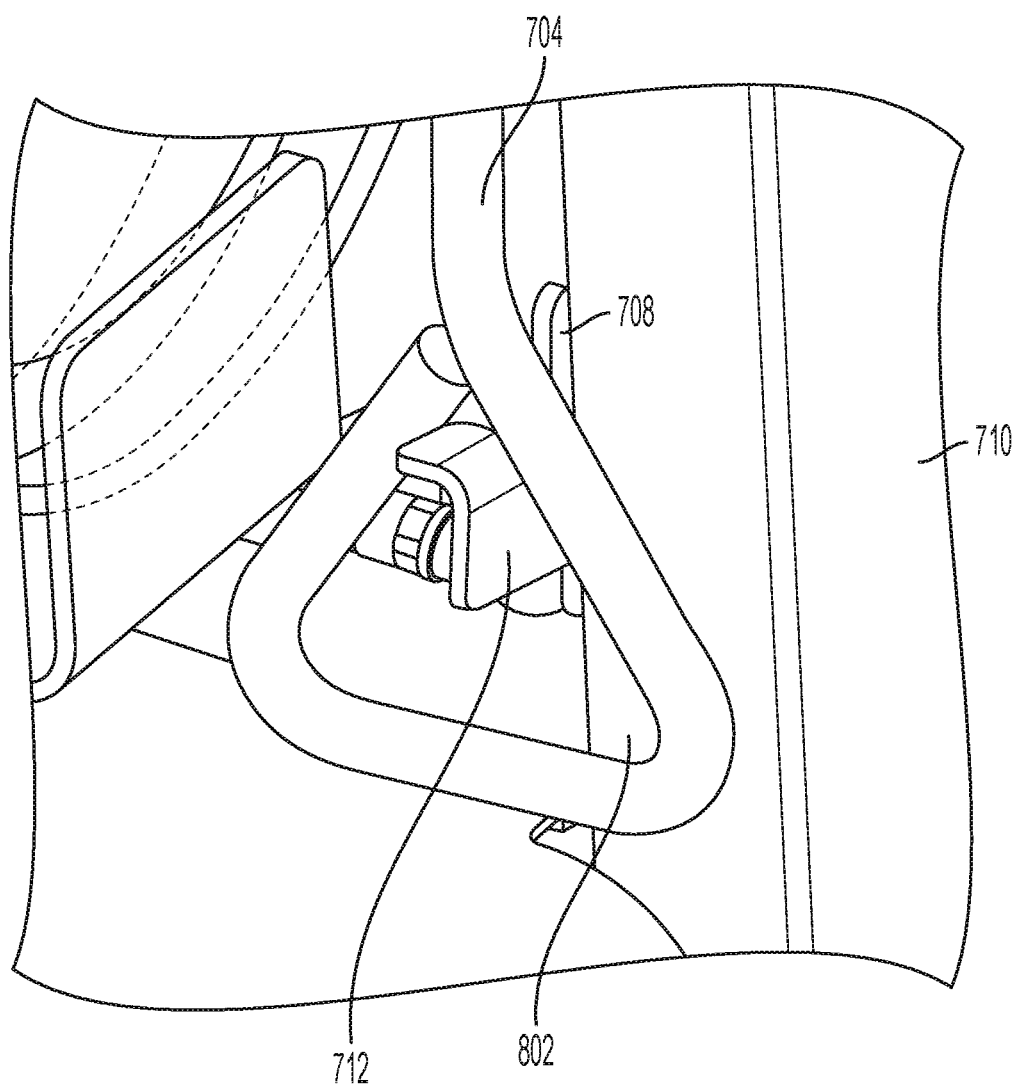
FIG. 8 illustrates close-up view of the dock plate tool holder bracket of FIG. 7.

FIG. 8 illustrates an example of the lower mounting plate 708 of FIG. 7. The lower mounting plate 708 may include the bracket 712 that may extend away from rear overhead guard leg 710. The bracket 712 may be configured to contact the handle of the dock plate tool 704 and limit or prevent movement of the dock plate tool 704. The handle of the dock plate tool 704 may form an opening 802 that is encircled by the handle. When the dock plate tool 704 is placed on the dock plate tool mount 700, the bracket 712 may extend into the opening to limit or prevent the handle from swinging as the lift truck moves.

In some examples, the bracket 712 may be flexible and may be bent to engage with the handle of the dock plate tool 704. In some examples, a portion of the bracket 712 may be flexible and bent, such that a portion of the handle of the dock plate tool 704 may become located between the flexible portion of the bracket 712 and the rest of the bracket 712, and may inhibit the dock plate tool 704 from swinging both forward and backward and from side-to-side. Further, in some examples, the bracket 712 may include a flexible material, such as rope, a hook and loop material, or some combination thereof, which may be attached around at least a portion of the dock plate tool 704 and may affix the dock plate tool 704 to the bracket 712. The flexible material may be disengaged, thus allowing the dock plate tool 704 to be removed from the dock plate tool mount 700.

Figure 9:
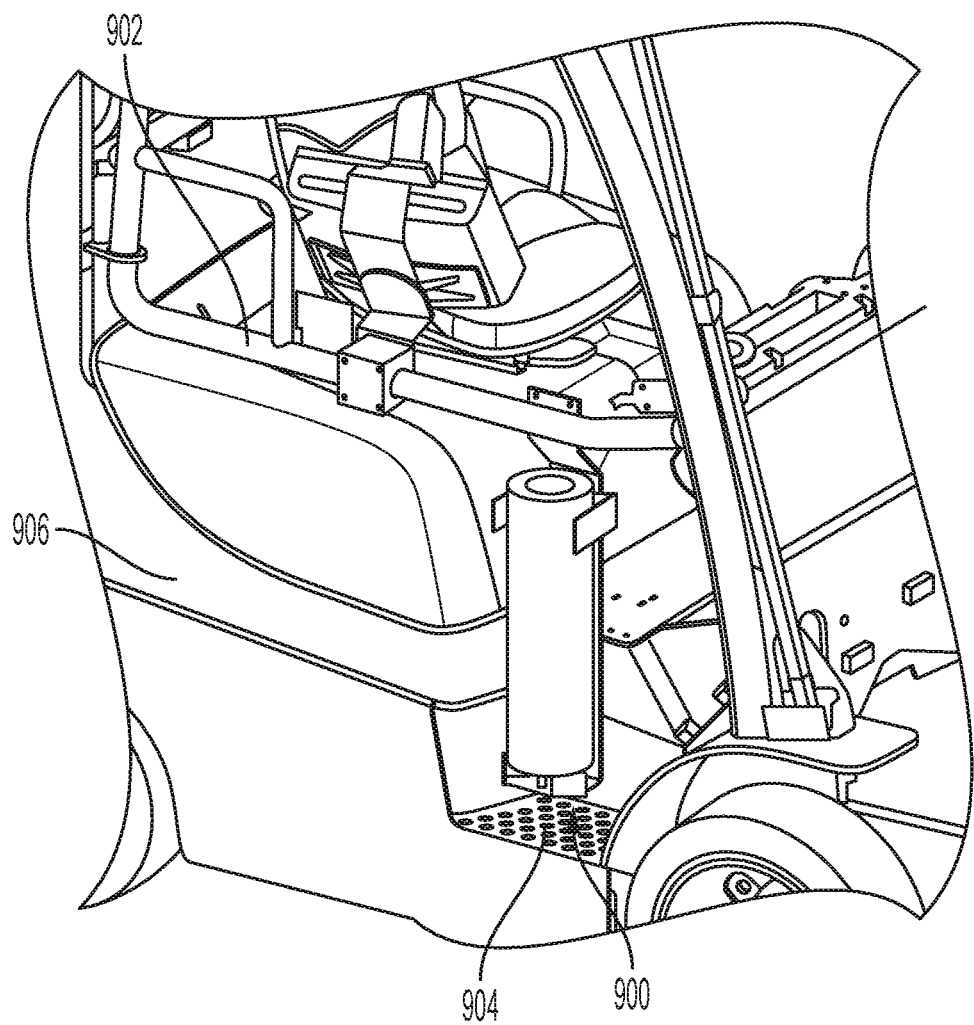
FIG. 9 illustrates a right isometric view of an example wrap holder mounted to an example accessory arm.

FIG. 9 illustrates an example wrap holder 900 attached to an accessory bar 902. For clarity, a portion of the clamping mechanism of the mount that secures the wrap holder 900 to the accessory bar 902 is omitted. The wrap holder 900 may be attached to a portion of the accessory bar 902 located above a step 904 of a lift truck 906 and may extend downwards from the accessory bar 902 toward the step 904. The wrap holder 900 may be secured to the accessory bar 902 via a mount, such as the mount 126 (FIG. 1). The wrap holder 900 is described further below in relation to FIG. 10.

In other examples, rather than the wrap holder 900 being attached to the accessory bar 902 above the step 904, another elongated accessory may be secured on the accessory bar 902 above the step 904. The step 904 may provide additional room for accessories to hang below the accessory bar that would conflict with portions of the lift truck 906 if attached at different locations along the accessory bar 902. Examples of other accessories that may be secured on the accessory bar 902 above the step 904 may include a fire extinguisher holder, a paper towel holder, or holders for other similar elongated objects often utilized in the same setting as lift trucks.

Figure 10:
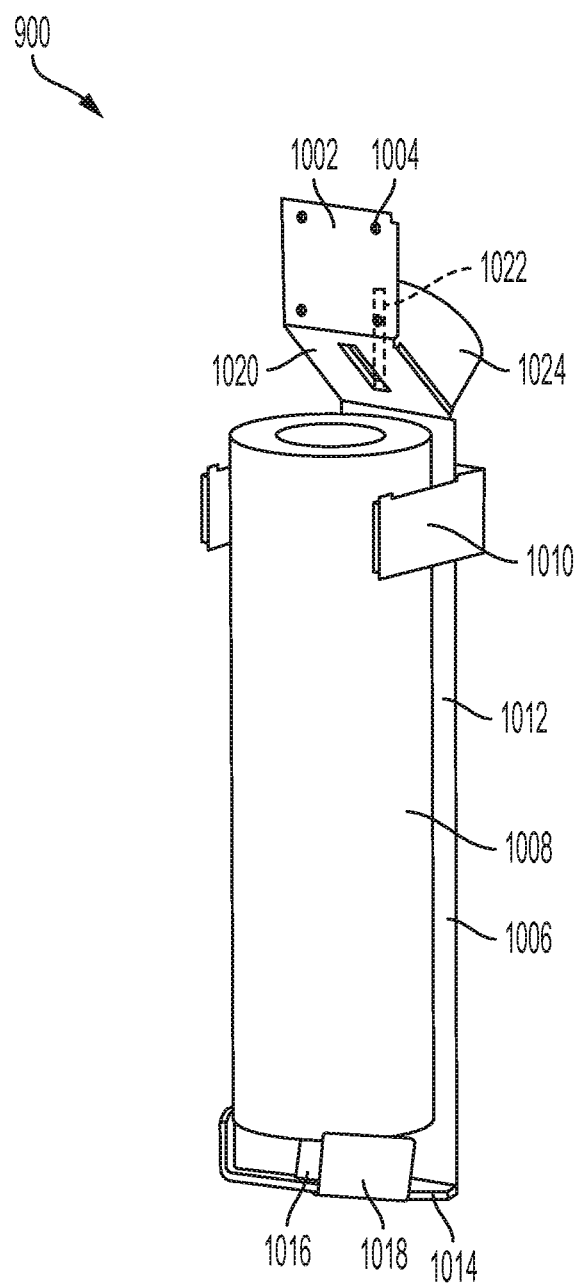
FIG. 10 illustrates a right isometric view of the wrap holder of FIG. 9.

FIG. 10 illustrates the example wrap holder 900 of FIG. 9. The wrap holder 900 may include a bracket portion 1002 with one or more apertures 1004. The bracket portion 1002 is utilized to connect the wrap holder 900 to a mount. Optionally, the bracket portion 1002 may form a portion of the mount, such as a part of the mount 126 (FIG. 1). In other examples, fasteners may engage with the apertures 1004 and the accessory bar, and may affix the wrap holder 900 to the accessory bar.

The wrap holder 900 may include main body 1006 that extends substantially vertically downwards from the bracket portion 1002. The main body 1006 may be utilized for holding the wrap 1008, which may be stretch wrap. In other examples, the main body 1006 may be utilized for holding paper towels or other elongated materials with a hollow circular core.

The wrap holder 900 may include one or more horizontal extrusions 1010 extending from a back portion 1012 of the main body 1006. The horizontal extrusions 1010 may extend substantially perpendicularly (within plus or minus 10 degrees from perpendicular) from the back portion 1012. The horizontal extrusions 1010 may be configured to extend from the back portion 1012 on at least two sides on the wrap 1008 and limit or prevent movement of an upper portion of the wrap 1008 in the directions of the horizontal extrusion 1010. In some examples, a distance between the horizontal extrusions 1010 may be adjustable based on a circumference of the wrap 1008, such that the limitation or prevention of the movement of the upper portion of the wrap 1008 may be adjust based on the distance between the horizontal extrusion 1010.

Optionally, the horizontal extrusions 1010 may be spring loaded, such that the horizontal extrusions 1010 are configured to move toward each other in the absence of an opposite force provided by contact with the wrap 1008. In such examples, the horizontal extrusions 1010 may be in contact with the sides of the wrap 1008 on which each of the horizontal extrusions 1010 is located and may provide a compression force on each side of the wrap 1008 where the horizontal extrusions 1010 are located. Also optionally, the horizontal extrusions 1010 include projections 1011 that facilitate retaining objects on the horizontal extrusions 1010, such as rolls of tape, straps, or other suitable objects.

The main body 1006 may include a bottom portion 1014 that is coupled to the back portion 1012 and extends from the back portion 1012. Optionally, the bottom portion 1014 extends at an upward angle with respect to the back portion 1012. For example, the bottom portion 1014 forms an angle of 80 degrees, plus or minus 5 degrees with the back portion 1012. In other examples, the bottom portion 1014 extends substantially horizontally from the back portion 1012 (within plus or minus 3 degrees from perpendicular). A central extrusion 1016 may extend upwards from the bottom portion 1014. The central extrusion 1016 may be configured to extend within a hollow core of the wrap 1008 and contact the walls of the hollow core. Accordingly, the central extrusion 1016 may limit or prevent movement of a lower portion of the wrap 1008.

Further, one or more vertical extensions 1018 may extend upwards from the bottom portion 1014. The vertical extensions 1018 may extend substantially vertically (within plus or minus 10 degrees from vertical) from edges of the bottom portion 1014. The vertical extensions 1018 may be configured to extend upwards around a circumference of the wrap 1008. The vertical extensions 1018 may limit or prevent movement of a lower portion of the wrap 1008 in a horizontal direction past a point of the vertical extensions 1018.

In some examples, the vertical extensions 1018 may contact the wrap 1008 around at least a portion of the circumference of the wrap 1008. In these examples, the vertical extensions 1018 may limit or prevent movement of the wrap 1008. Optionally, the vertical extensions 1018 may be spring loaded, such that the vertical extensions 1018 are configured to move toward each other in the absence of an opposite force provided by contact with the wrap 1008. In these examples, the vertical extensions 1018 may be in contact with the sides of the wrap 1008 on which each of the vertical extensions 1018 is located and may provide a compression force on each side of the of wrap 1008 where the vertical extensions 1018 are located.

The wrap holder 900 may include a slanted portion 1020 located intermediate to the bracket portion 1002 and the back portion 1012. The slanted portion 1020 may include a mounting extrusion 1022 (FIG. 6). The mounting extrusion 1022 may extend substantially perpendicularly (within plus or minus 10 degrees from perpendicular) to the slanted portion 1020. The mounting extrusion 1022 may be utilized for retaining a roll of tape 1024, or similar items with a hollow core, on the slanted portion 1020 of the wrap mount 900. The mounting extrusion 1022 may be configured to extend into a hollow core of the roll of tape 1024 and contact the inner wall of the hollow core. The roll of tape 1024 may be maintained on the mounting extrusion 1022 and the slanted portion 1020 by frictional interference between the extrusion 1022 and the hollow core of the tape 1024, by gravitational force, or both.

Figure 11A:
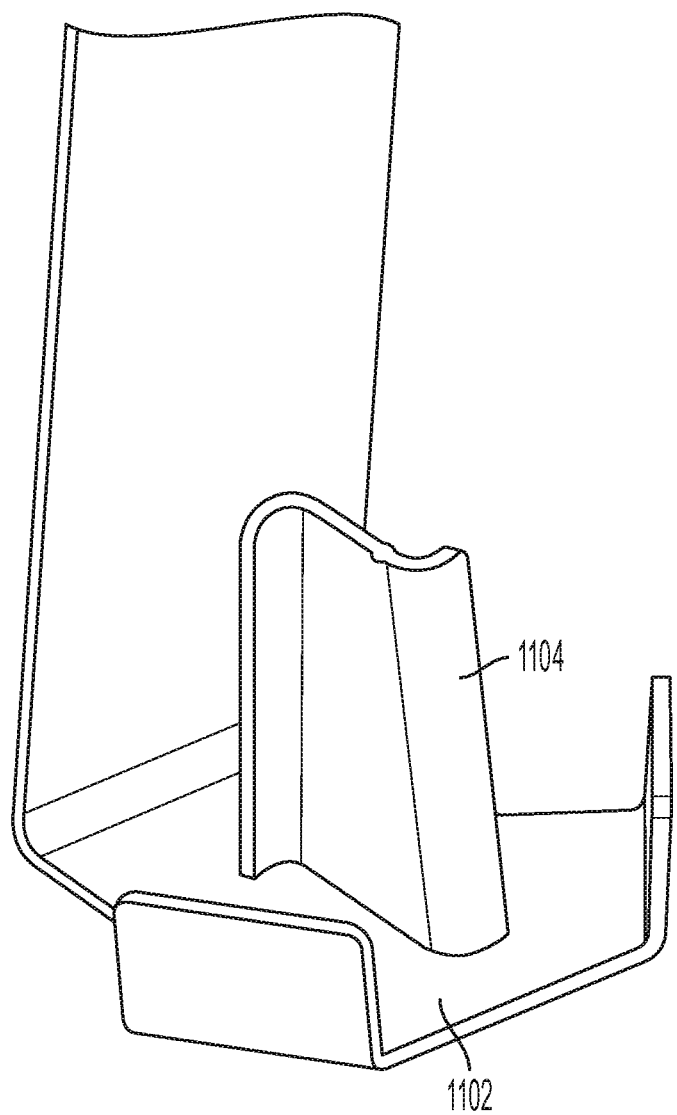
FIG. 11A illustrates a close-up rear isometric view of the bottom portion of an exemplary wrap holder.
Figure 11B:
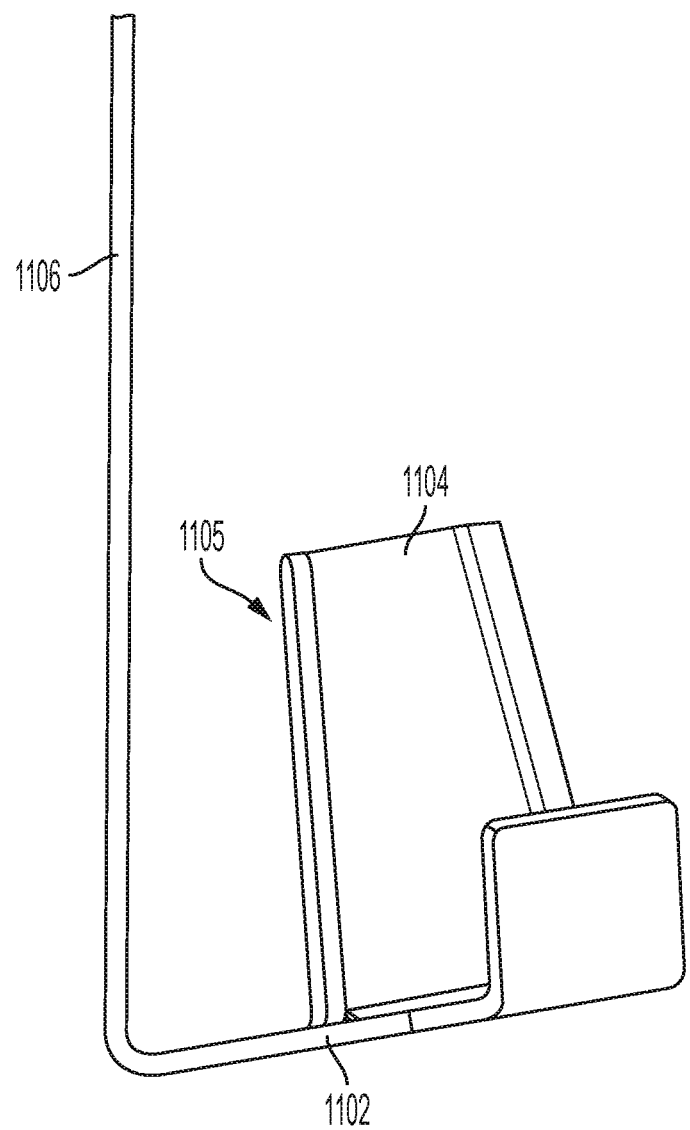
FIG. 11B illustrates a close-up right view of the bottom portion of the wrap holder of FIG. 11A.

FIGS. 11A and 11B illustrate an optional bottom portion 1102 of a wrap holder, such as wrap holder 900 of FIG. 9. The bottom portion 1102 may include one or more of the features of the bottom portion 1014 (FIG. 10), including the vertical extensions 1018 (FIG. 10), the central extrusion 1016 (FIG. 10), or some combination thereof.

As illustrated, an optional central extrusion 1104 extends upwards from the bottom portion 1102. The central extrusion 1104 includes an S-shaped cross section, and is conical such that the S-shaped cross section distal from bottom 1102 is smaller than the S-shaped cross section proximate bottom 1102. Such a conical, S-shaped extrusion 1104 facilitates engaging the hollow core of objects that are of different sizes and shapes, preferably without such objects contacting the bottom portion 1102. The central extrusion 1104 may be configured to extend within a hollow core of a wrap, such as the wrap 1008 (FIG. 10) and portions of the end of the S-shape may contact the walls of a hollow core of the wrap. Optionally, the central extrusion 1104 is angularly offset with respect to the bottom portion 1102 such that an outer surface 1105 of the conical S-shaped profile of central extrusion 1104 that is proximate the back portion 1106 is substantially parallel, for example, within plus or minus 5 degrees of parallel, with the back portion 1106. Such a substantially parallel outer surface 1105 facilitates retaining an object, such as a roll of wrap, without a top of the object moving away from a lift truck during maneuvers such as cornering. Accordingly, the central extrusion 1016 inhibits movement of a lower portion of the wrap 1008 as well as inhibits movement of an upper portion of the wrap 1008.

Figure 12:
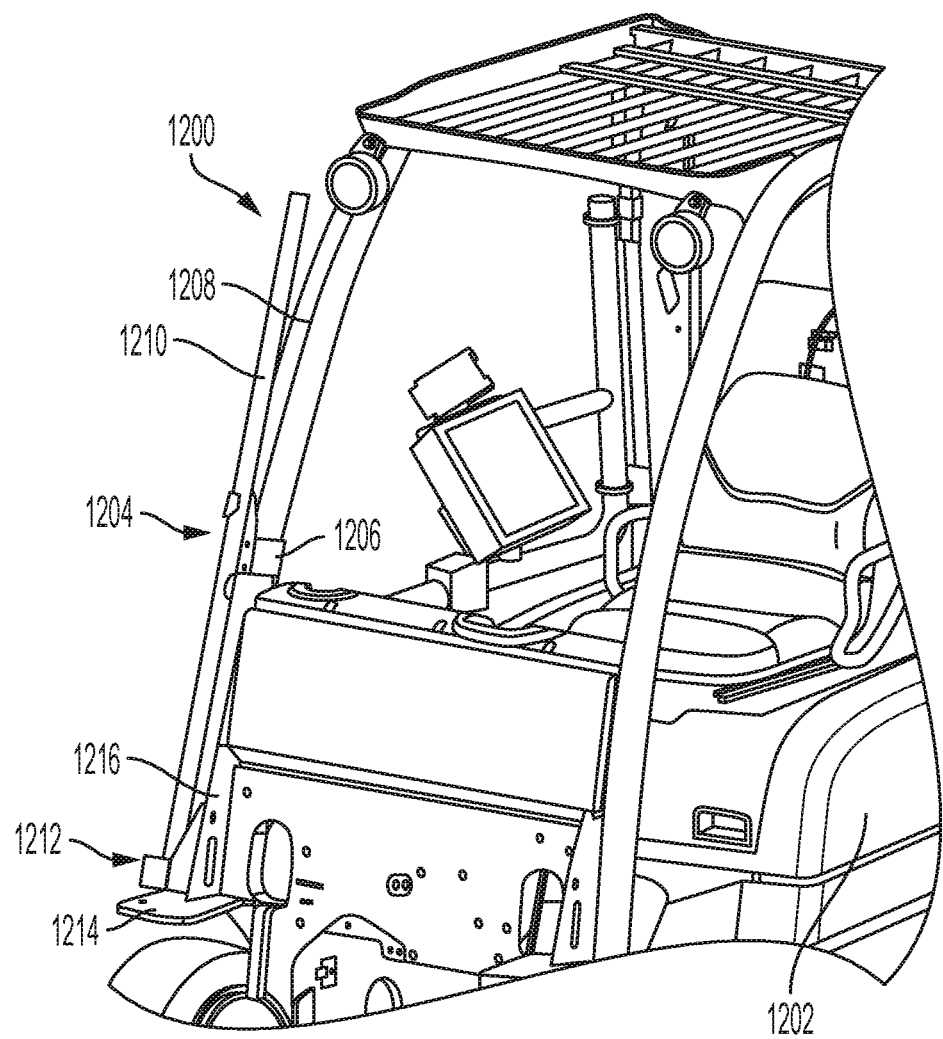
FIG. 12 illustrates a left isometric view of an example accessory arm bearing a load bar tool holder.

FIG. 12 illustrates an example load bar tool holder 1200. The load bar tool holder 1200 may be utilized for securing a load bar tool, a cargo bar tool, other suitable elongate tool, or any combination thereof, to a lift truck 1202. The load bar tool and the cargo bar tool may be used to engage with load bars and cargo bars, respectively, that create shelf-type units for loading cargo within a shipping unit, such as a trailer of a truck, a cargo container, and a train car. The load bar tool and the cargo bar tool may be utilized for raising and lowering the load bars and cargo bars for loading and unloading cargo from the shipping unit.

The load bar tool holder 1200 may include a handle retaining bracket 1204. The handle retaining bracket 1204 may be coupled to a front attachment mechanism 1206 affixed to a front overhead guard leg 1208 of the lift truck 1202. The handle retaining bracket 1204 may be utilized for securing a handle of a load bar tool 1210 and limit or prevent movement of the handle. The handle retaining bracket 1204 will be described in more detail below in relation to FIG. 14.

The load bar tool holder 1200 may include a cradle 1212. The cradle 1212 may be mounted to a lower portion of the front overhead guard leg 1208. The cradle 1212 may be mounted to the front overhead guard leg 1208 at a location lower than the handle retaining bracket 1204 is coupled to the front attachment mechanism 1206. The cradle 1212 may be mounted to the front overhead guard leg 1208 at a location directly above a front tire well 1214 of the lift truck 1202. In other examples, the cradle 1212 may couple to one or more apertures of a front bracket 1216 of the lift truck 1202, the front bracket 1216 forming a portion of the frame of the lift truck 1202. The one or more apertures of the front bracket 1216 may be standard for lift trucks. The front bracket 1216 may support the cradle over the front tire well 1214. The cradle 1212 will be described in more detail below in relation to FIG. 13.

The load bar tool holder 1200 may support a head of the load bar tool 1210 in the cradle 1212 with the handle of the load bar tool 1210 extending through the handle retaining bracket 1206. When mounted in the load bar tool holder 1200, the load bar tool 1210 may be positioned along the front overhead guard leg 1208. In some examples, the load bar tool holder 1200 may be located along a right side of the lift truck 1202, such that the load bar tool 1210 is positioned along the front overhead leg 1208 on the right side of the lift truck 1202. In other examples, a load bar tool holder may be located along a left side of the lift truck 1202, such that the load bar tool 1210 is positioned along the front overhead leg 1208 on the left side of the lift truck 1202.

Figure 13:
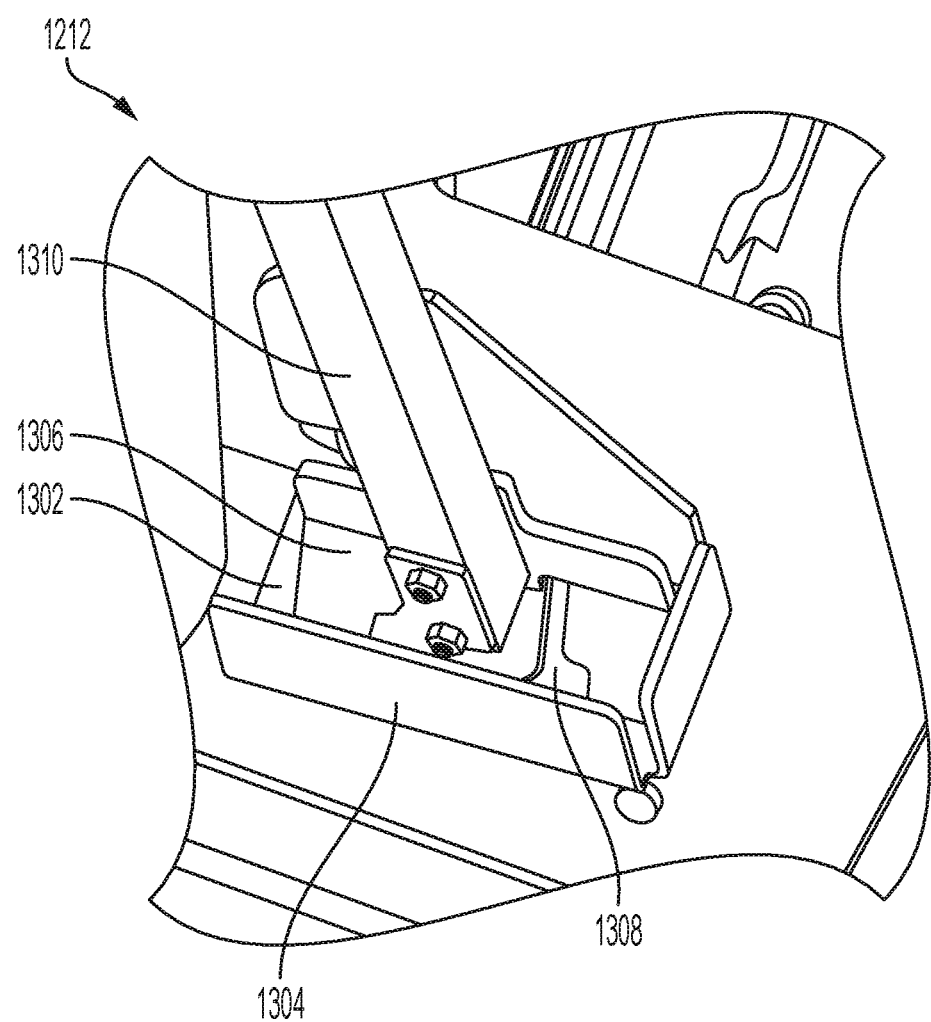
FIG. 13 illustrates a top isometric view of a cradle of the load bar tool holder of FIG. 12.

FIG. 13 illustrates an example cradle 1212 of the load bar tool holder 1200 of FIG. 12. The cradle 1212 may include a bottom portion 1302. The bottom portion 1302 may extend along a substantially horizontal plane (within plus or minus 10 degrees from horizontal). When inserted in the load bar tool holder 1200, a head 1306 of the load bar tool may rest on the bottom portion 1302.

One or more vertical extrusions 1304 may extend upward from the bottom portion 1302. The vertical extrusions 1304 may extend substantially perpendicularly (within plus or minus 10 degrees from perpendicular) from the bottom portion 1302. The vertical extrusions 1304 may extend upward from one or more edges of the bottom portion 1302. In some examples, the cradle 1212 may include three vertical extrusions 1304 that extend upward from three edges of the bottom portion 1304. The vertical extrusions 1304 may limit or prevent movement of the head 1306 in directions toward the vertical extrusions 1304.

The cradle 1212 may further include one or more tabs 1308 that extend from one or more of the vertical extrusions 1304. The tabs 1308 may extend at an angle from the vertical extrusion 1304 from which the tabs 1308 extend, with the tabs 1308 extending toward an opposing edge of the bottom portion 1302. The head 1306 may be located between the tabs 1308 and the bottom portion 1302 when the load bar tool is placed within the load bar tool mount. The tabs 1308 may extend above the head 1306 when the load bar tool is placed within the load bar tool mount and may limit or prevent movement of the head 1306 in the upward direction. In some examples, there may be two tabs 1308 where a handle 1310 of the load bar tool extends between the two tabs 1308 when the load bar tool is placed in the load bar tool mount.

Figure 14:
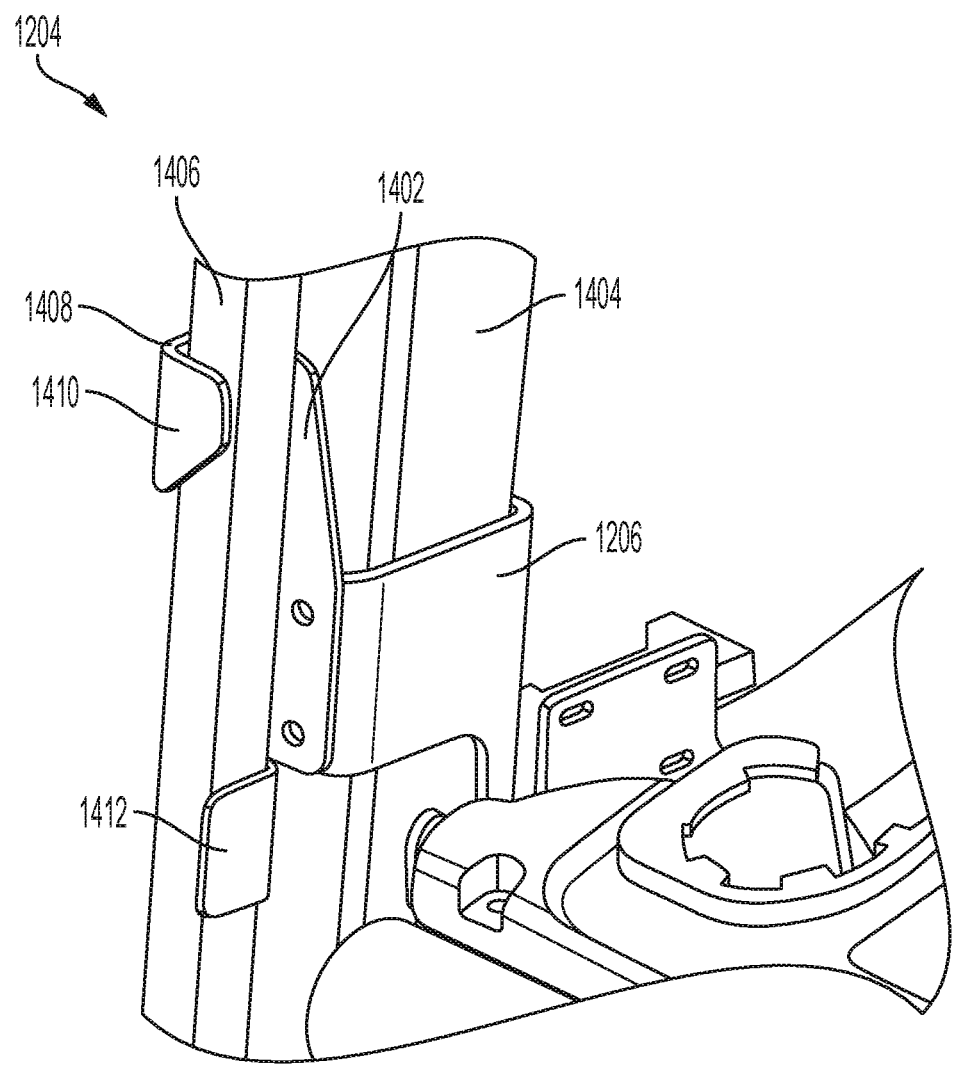
FIG. 14 illustrates a left isometric view of a handle retaining bracket of the load bar tool holder of FIG. 12.

FIG. 14 illustrates an example handle retaining bracket 1204 of the load bar tool holder 1200 of FIG. 12. The retaining bracket 1204 may include a main body 1402. The main body 1402 may be coupled to the front attachment mechanism 1206. The main body 1402 may extend along the front overhead guard leg 1404.

An upper extrusion 1408 may extend from an upper portion of the main body 1402. The upper extrusion 1408 may extend substantially perpendicularly (within plus or minus 10 degrees from perpendicular) from the main body. The upper extrusion 1408 may include a hooked portion 1410 that may be substantially parallel (within plus or minus 10 degrees to parallel) to the main body 1402. The main body 1402 and the hooked portion 1410 may be located on opposing ends of the upper extrusion 1408.

A lower extrusion 1412 may extend from a lower portion of the main body 1402. The lower extrusion 1412 may extend substantially perpendicularly (within plus or minus degrees from perpendicular) from the main body 1402. The lower extrusion 1412 and the upper extrusion 1408 may extend from opposing edges of the main body 1402.

When placed in the load bar tool holder 1200, the handle 1406 of the load bar tool may contact the main body 1402 of the handle retaining bracket 1204 and may extend between the upper extrusion 1408 and the lower extrusion 1412. The hooked portion 1410 of the upper extrusion 1408 may wrap around the handle 1406. The handle 1406 may rest against the main body 1402, and the upper extrusion 1408 and the lower extrusion 1412 may limit or prevent movement of the handle 1408 away from the main body 1402. The handle 1406 may be placed in the load bar tool mount by placing the handle 1406 against the main body 1402 at an angle and rotating the load bar tool until the handle 1406 contacts both the upper extrusion 1408 and the lower extrusion 1412. The load bar tool is then slid towards the cradle 1212 to be secured to the lift truck 1202 by the load bar tool holder 1200. Removing the load bar tool from the load bar tool holder 1200 may be accomplished by sliding the load bar tool away from the cradle 1212, then rotating the load bar tool such that the handle is released from the handle retaining bracket 1204.

Having described and illustrated various examples herein, it should be apparent that other examples may be modified in arrangement and detail. We claim all modifications and variations coming within the spirit and scope of the following claims.

What is claimed is:

1. An accessory arm for a lift truck, comprising:
    at least one rear attachment mechanism sized and shaped to be affixed to a rear overhead guard leg of a lift truck;
    a front attachment mechanism sized and shaped to be affixed to a front overhead guard leg of the lift truck, the front attachment mechanism including a first portion of a latch mechanism;
    an accessory bar rotationally mounted to the at least one rear attachment mechanism and including a second portion of the latch mechanism configured to releasably engage the first portion of the latch mechanism when the accessory bar is in a closed position;
    at least one mount releasably attached to the accessory bar, the at least one mount sized and shaped to affix an accessory to the accessory bar such that the accessory is positionable at a user selected position; and
    a monitor holder attached to the at least one mount, wherein the monitor holder further comprises a scanner holder, and wherein the at least one mount further comprises a second mount affixing an elongated accessory holder to the accessory bar such that the elongated accessory holder is suspended over a step of the lift truck when the accessory arm is affixed to the lift truck.

2. The accessory arm of claim 1, wherein the at least one mount comprises a clamping device configured to releasably attach the at least one mount to the accessory bar at one or more locations along a length of the accessory bar.

3. The accessory arm of claim 1, wherein the elongated accessory holder comprises:
a back portion extending substantially vertically down from the accessory arm;
a bottom portion extending away from the back portion at an upward angle with respect to the back portion; and
a central extrusion extending from the bottom portion towards the back portion, wherein the central extrusion is angularly offset from the bottom portion such that an outer surface of the central extrusion is substantially parallel with the back portion.

4. The accessory arm of claim 3, wherein the central extrusion comprises:
a conical S-shaped cross section that is larger proximate the bottom portion than distal from the bottom portion.

5. The accessory arm of claim 3, wherein the elongated accessory holder further comprises a slanted portion that extends between the back portion and the accessory arm, and wherein a mounting extrusion is formed in the slanted portion and extends substantially vertically from the slanted portion.

6. The accessory arm of claim 1, wherein:
the at least one rear attachment mechanism comprises an upper rear attachment mechanism and a lower rear attachment mechanism.

7. The accessory arm of claim 6, further comprising an extension plate that extends between the upper rear attachment mechanism and the lower rear attachment mechanism, wherein the extension plate maintains a distance between the upper rear attachment mechanism and the lower rear attachment mechanism.

8. The accessory arm of claim 6, wherein:
the upper rear attachment mechanism comprises an upper mounting plate that includes an aperture sized and shaped to receive a hooked end of a dock plate tool; and
the lower rear attachment mechanism comprises a lower mounting plate that includes a bracket sized and shaped to retain a handle of the dock plate tool such that movement of the dock plate tool handle is inhibited when retained by the bracket.

9. The accessory arm of claim 6, wherein the accessory bar includes a first L-shaped portion and a second L-shaped portion, wherein a substantially vertical portion of the first L-shaped portion extends along the rear overhead guard leg and a substantially horizontal portion of the first L-shaped portion extends substantially perpendicularly from the substantially vertical portion, and wherein a substantially horizontal portion of the second L-shaped portion is affixed to the substantially vertical portion of the first L-shaped portion and extends substantially perpendicularly from the substantially vertical portion of the first L-shaped portion and a substantially vertical portion of the second L-shaped portion is affixed to the substantially horizontal portion of the first L-shaped portion and extends substantially perpendicularly from the substantially horizontal portion of the first L-shaped portion, and wherein the mount is attached to the second L-shaped portion of the accessory bar.

10. The accessory arm of claim 1, wherein the front attachment mechanism comprises a handle retaining bracket and the accessory arm further comprises a cradle sized and shaped to be affixed to the lift truck, the handle retaining bracket and the cradle cooperating to hold a load bar tool when the accessory arm is affixed to the lift truck.

11. The accessory arm of claim 1, further comprising a wiring harness routed within the accessory bar to an accessory affixed to the accessory bar, the wiring harness sized and shaped to connect to a battery of the lift truck to provide power to the accessory.

12. The accessory arm of claim 11, further comprising an electrical socket mounted on an exterior of the accessory bar, wherein the wiring harness is routed within the accessory bar to the electrical socket and is electrically coupled to the electrical socket.

13. The accessory arm of claim 1, wherein the accessory bar is rotationally mounted to the at least one rear attachment mechanism such that the second portion of the latch mechanism is at a vertically elevated position when the accessory bar is at an open position compared to when the accessory bar is at a closed position.

14. The accessory arm of claim 1, wherein the accessory bar includes a plurality of apertures formed along a length of the accessory bar, and wherein the second mount is affixed to the accessory bar by one or more fasteners that engage with at least one aperture of the plurality of apertures.

15. An accessory arm for a lift truck, comprising:
at least one rear attachment mechanism sized and shaped to be affixed to a rear overhead guard leg of a lift truck;
a front attachment mechanism sized and shaped to be affixed to a front overhead guard leg of the lift truck, the front attachment mechanism including a first portion of a latch mechanism;
an accessory bar rotationally mounted to the at least one rear attachment mechanism and including a second portion of the latch mechanism configured to releasably engage the first portion of the latch mechanism when the accessory bar is in a closed position; and
at least one mount releasably attached to the accessory bar, the at least one mount sized and shaped to affix an accessory to the accessory bar such that the accessory is positionable at a user selected position, wherein the at least one rear attachment mechanism comprises an upper rear attachment mechanism and a lower rear attachment mechanism, wherein the upper rear attachment mechanism comprises an upper mounting plate that includes an aperture sized and shaped to receive a hooked end of a dock plate tool, and wherein the lower rear attachment mechanism comprises a lower mounting plate that includes a bracket sized and shaped to retain a handle of the dock plate tool such that movement of the dock plate tool handle is inhibited when retained by the bracket.

16. The accessory arm of claim 15, wherein the accessory bar includes a first L-shaped portion and a second L-shaped portion, wherein a substantially vertical portion of the first L-shaped portion extends along the rear overhead guard leg and a substantially horizontal portion of the first L-shaped portion extends substantially perpendicularly from the substantially vertical portion, and wherein a substantially horizontal portion of the second L-shaped portion is affixed to the substantially vertical portion of the first L-shaped portion and extends substantially perpendicularly from the substantially vertical portion of the first L-shaped portion and a substantially vertical portion of the second L-shaped portion is affixed to the substantially horizontal portion of the first L-shaped portion and extends substantially perpendicularly from the substantially horizontal portion of the first L-shaped portion, and wherein the mount is attached to the second L-shaped portion of the accessory bar.

17. An accessory arm for a lift truck, comprising:
at least one rear attachment mechanism sized and shaped to be affixed to a rear overhead guard leg of a lift truck;
a front attachment mechanism sized and shaped to be affixed to a front overhead guard leg of the lift truck, the front attachment mechanism including a first portion of a latch mechanism;
an accessory bar rotationally mounted to the at least one rear attachment mechanism and including a second portion of the latch mechanism configured to releasably engage the first portion of the latch mechanism when the accessory bar is in a closed position; and
at least one mount releasably attached to the accessory bar, the at least one mount sized and shaped to affix an accessory to the accessory bar such that the accessory is positionable at a user selected position, wherein the front attachment mechanism comprises a handle retaining bracket and the accessory arm further comprises a cradle sized and shaped to be affixed to the lift truck, the handle retaining bracket and the cradle cooperating to hold a load bar tool when the accessory arm is affixed to the lift truck.

18. An accessory arm for a lift truck, comprising:
at least one rear attachment mechanism sized and shaped to be affixed to a rear overhead guard leg of a lift truck;
a front attachment mechanism sized and shaped to be affixed to a front overhead guard leg of the lift truck, the front attachment mechanism including a first portion of a latch mechanism;
an accessory bar rotationally mounted to the at least one rear attachment mechanism and including a second portion of the latch mechanism configured to releasably engage the first portion of the latch mechanism when the accessory bar is in a closed position;
at least one mount releasably attached to the accessory bar, the at least one mount sized and shaped to affix an accessory to the accessory bar such that the accessory is positionable at a user selected position;
a wiring harness routed within the accessory bar to an accessory affixed to the accessory bar, the wiring harness sized and shaped to connect to a battery of the lift truck to provide power to the accessory; and
an electrical socket mounted on an exterior of the accessory bar, wherein the wiring harness is routed within the accessory bar to the electrical socket and is electrically coupled to the electrical socket.

* * * * *